United States Patent
Dinkel

(10) Patent No.: US 8,857,922 B2
(45) Date of Patent: Oct. 14, 2014

(54) HYDRAULIC VEHICLE BRAKE SYSTEM

(75) Inventor: Dieter Dinkel, Schwalbach (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 13/704,502

(22) PCT Filed: Jun. 10, 2011

(86) PCT No.: PCT/EP2011/059666
§ 371 (c)(1),
(2), (4) Date: Dec. 14, 2012

(87) PCT Pub. No.: WO2011/160963
PCT Pub. Date: Dec. 29, 2011

(65) Prior Publication Data
US 2013/0093237 A1    Apr. 18, 2013

(30) Foreign Application Priority Data

Jun. 22, 2010   (DE) .......................... 10 2010 030 321

(51) Int. Cl.
*B60T 13/16*        (2006.01)
*B60T 13/14*        (2006.01)
*B60T 8/48*         (2006.01)

(52) U.S. Cl.
CPC ............. *B60T 13/141* (2013.01); *B60T 8/4872* (2013.01)
USPC ........... 303/10; 303/116.1; 303/152; 303/155

(58) Field of Classification Search
USPC ................. 303/10, 3, 11, 15, 20, 6.01, 113.1, 303/115.2, 116.1, 116.2, 119.1, 151, 152, 303/155
See application file for complete search history.

(56) References Cited

U.S. PATENT DOCUMENTS 5,853,229 A * 12/1998 Willmann et al. ................. 303/3
6,082,830 A *  7/2000 Volz et al. .................. 303/113.4

(Continued)

FOREIGN PATENT DOCUMENTS

DE     004002635 A1 *  8/1991
DE     196 04 134 A1    8/1997

(Continued)

OTHER PUBLICATIONS

German Examination Report—Jan. 22, 2011.
PCT International Search Report—Aug. 23, 2011.

*Primary Examiner* — Pamela Rodriguez
(74) *Attorney, Agent, or Firm* — Brinks Gilson & Lione

(57) ABSTRACT

A hydraulic vehicle brake system including a brake line for conducting a hydraulic pressure medium and a master cylinder attached to a non-pressurized storage vessel. A wheel brake has a first pressure modulation valve on the inlet side and a second pressure modulation valve and a low-pressure accumulator on the outlet side of the wheel brake. A pump is disposed on a return line downstream of the low-pressure accumulator for removing pressurizing medium from the low-pressure accumulator to regulate the brake pressure via the first pressure modulation valve and also via an isolation valve disposed in the brake line upstream of the first pressure modulation valve. An electromagnetically opening changeover valve is inserted in a pump suction line discharging into the return line between the master cylinder and the low-pressure accumulator. The pressure provided by the master cylinder can be fed to the low-pressure accumulator, bypassing the wheel brake.

6 Claims, 2 Drawing Sheets

(56) References Cited

U.S. PATENT DOCUMENTS

| | | | |
|---|---|---|---|
| 6,149,247 A * | 11/2000 | Hofmann et al. | 303/113.4 |
| 6,199,958 B1 * | 3/2001 | Baechle | 303/10 |
| 8,042,884 B2 * | 10/2011 | Weh et al. | 303/116.1 |
| 8,123,310 B2 * | 2/2012 | Haupt et al. | 303/152 |
| 8,414,089 B2 * | 4/2013 | Feigel et al. | 303/113.1 |
| 2005/0173978 A1 * | 8/2005 | Fennel et al. | 303/114.3 |
| 2010/0109427 A1 * | 5/2010 | Baumann | 303/9.75 |
| 2013/0241274 A1 * | 9/2013 | Dinkel et al. | 303/6.01 |

FOREIGN PATENT DOCUMENTS

| | | |
|---|---|---|
| DE | 197 28 302 A1 | 1/1999 |
| DE | 10 2006 033 890 A1 | 1/2008 |
| DE | 10 2008 005 145 A1 | 7/2009 |
| EP | 0 950 004 B1 | 5/2001 |
| EP | WO 2004/101308 A1 | 11/2004 |
| EP | WO 2008/155045 | 12/2008 |
| JP | 2006-137221 | 6/2006 |
| JP | 2009-202678 | 9/2009 |

* cited by examiner

HYDRAULIC VEHICLE BRAKE SYSTEM

CROSS-REFERENCE TO RELATED APPLICATION

This application claims priority to German Patent Application No. 10 2010 030 321.6, filed Jun. 22, 2010 and PCT/EP2011/059666, filed Jun. 10, 2011.

FIELD OF THE INVENTION

The invention relates to a hydraulic motor vehicle brake system.

A hydraulic vehicle brake system having a device for anti-lock braking control, anti-slip regulation and electronic stability control is already known from EP 0 950 004 B1. Each brake circuit in this vehicle brake system is provided with a brake line which connects a brake pressure sensor to a pair of wheel brakes, wherein pressure modulation valves are inserted into the brake line and also into a return line connected to the wheel brakes to regulate the wheel brake pressure, said valves regulating the brake pressure in terms of the pressure increase, pressure retention and pressure reduction phases in conjunction with a return pump. Upstream of the return pump, a low-pressure accumulator is attached to the return line to receive the pressurizing medium which must be quickly released from one of the wheel brakes at risk of locking during the pressure reduction phase.

So as to guarantee that when the brake system is used in an electric or hybrid vehicle, the wheel brakes are not actuated during deceleration of the vehicle for the purposes of achieving the highest possible energy recovery when the electric or hybrid vehicle is in generator mode, it is proposed that the pressure modulation valve inserted in each of the return lines should be open, so that the brake pressure generated during actuation of the brake can reach the low-pressure accumulator rather than the wheel brakes. Since the low-pressure accumulator usually receives a spring-loaded piston sealed in the accumulator chamber, a correspondingly high actuation pressure is required, so that the accumulator chamber is able to receive the brake pressure generated rather than the wheel brakes. Consequently, the low-pressure accumulator causes a certain hysteresis, as a result of which an unwanted, significant pressure increase in the wheel brakes cannot be precluded, which has a negative effect on energy recovery when the vehicle is in generator mode.

The problem addressed by the present invention is therefore one of designing a hydraulic vehicle brake system of the kind indicated using simple, inexpensive means wherever possible, such that when the electric or hybrid vehicle is in generator mode, no or only a slight, negligible pressure increase takes place in the wheel brakes.

This problem is solved according to the invention for a hydraulic vehicle brake system of the kind in accordance with this invention.

Further features and advantages of the invention emerge in the following from this description.

DETAILED DESCRIPTION OF THE INVENTION

Figure 1:
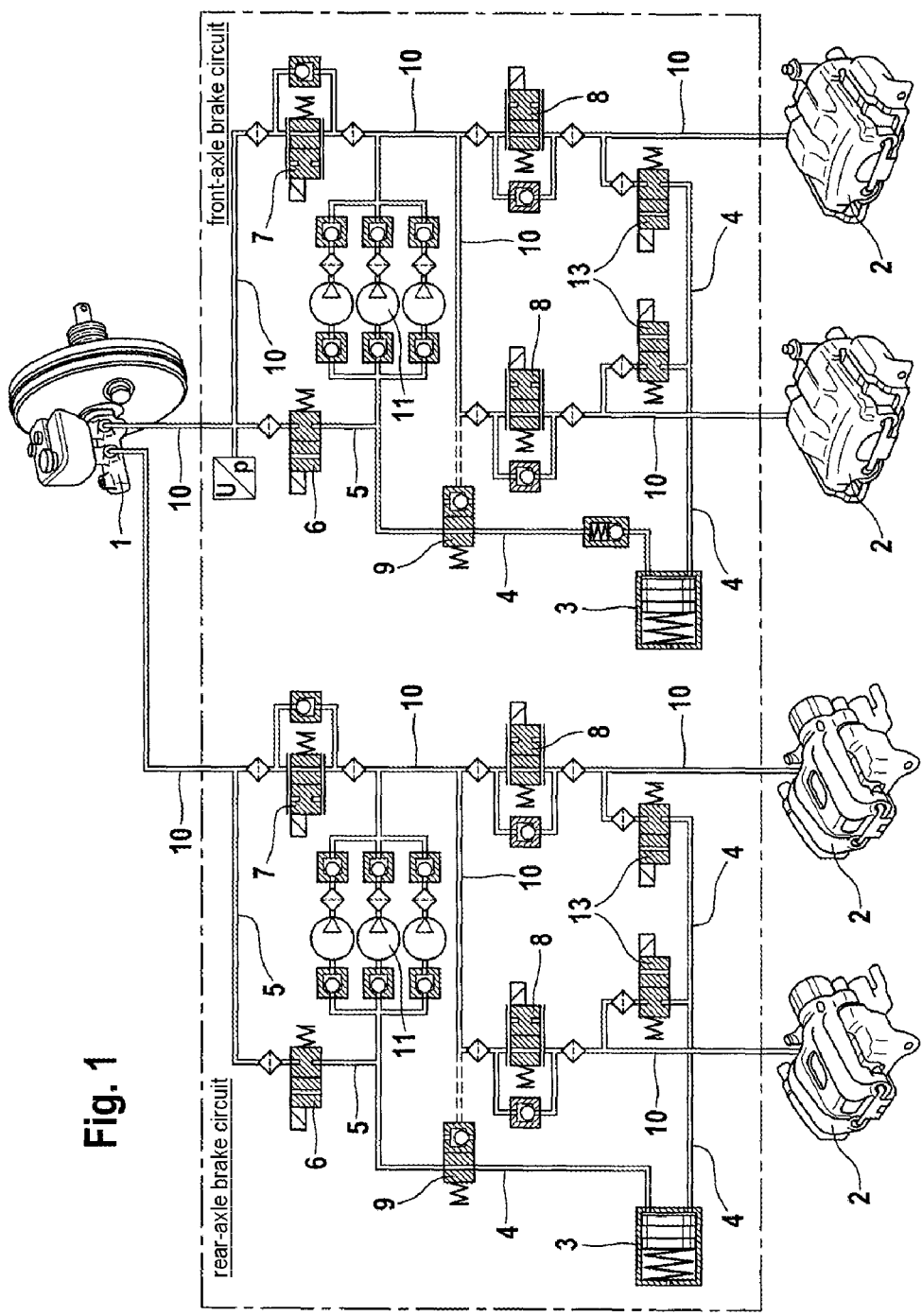
FIGS. 1 and 2 each show a hydraulic connection diagram for a vehicle brake system with anti-lock braking control, anti-slip regulation and electronic stability control, which is designed as a two-circuit brake system.

Each of the brake circuits shown exhibits a brake line 10, which connects a master cylinder 1 to a pair of wheel brakes 2, for which purpose the brake line 10 is branched to the two wheel brakes 2. In each branch of the brake line 10 there is a pressure modulation valve 8 on the inlet side upstream of each wheel brake 2. Between each pressure modulation valve 8 on the inlet side and the associated wheel brake 2, a branch of a return line 4 is attached to each brake line 10, a pressure modulation valve 13 being inserted in said return line on the outlet side in each case, said valve connecting the attached wheel brake 2 in each case to a low-pressure accumulator 3 in the electromagnetically actuated open position, the piston belonging to the low-pressure accumulator 3 being acted on by an accumulator spring.

The vehicle brake system shown is designed according to the return system, such that a pump 11 driven by an electric motor is inserted in each brake circuit, said pump conveying the pressurizing medium received in the low-pressure accumulator 3 back again to the two wheel brakes 2 of each brake circuit and also in the direction of the master cylinder 1 via the pressure modulation valves 8 on the inlet side during brake pressure regulation. To improve comfort and also performance, the pump depicted is a so-called six-piston pump, for example, so that each brake circuit has three pistons each to convey the pressurizing medium.

The details described hitherto comprise the functional elements required for anti-lock braking control. So that anti-slip regulation and also electronic stability control are also possible, there is in addition in each brake circuit between the master cylinder 1 and the pressure modulation valve 8 on the inlet side an isolation valve 7 which is open in the basic setting and also, in addition, upstream of this isolation valve 7 a pump suction line 5 provided with an electromagnetic changeover valve 6, in order to guarantee a direct pressurizing medium supply to the pump 11 from the master cylinder 1 or the storage vessel thereof for electronic stability control, for which purpose the changeover valve 6, which is normally closed in the basic setting, is open. Both in the electronic stability control and also in the anti-slip regulation, the isolation valve 7 adopts its closed position when electromagnetically excited, so that the pressurized medium to be conveyed from the pump 11 to the wheel brakes 2 does not escape into the master cylinder 1.

Figure 2:
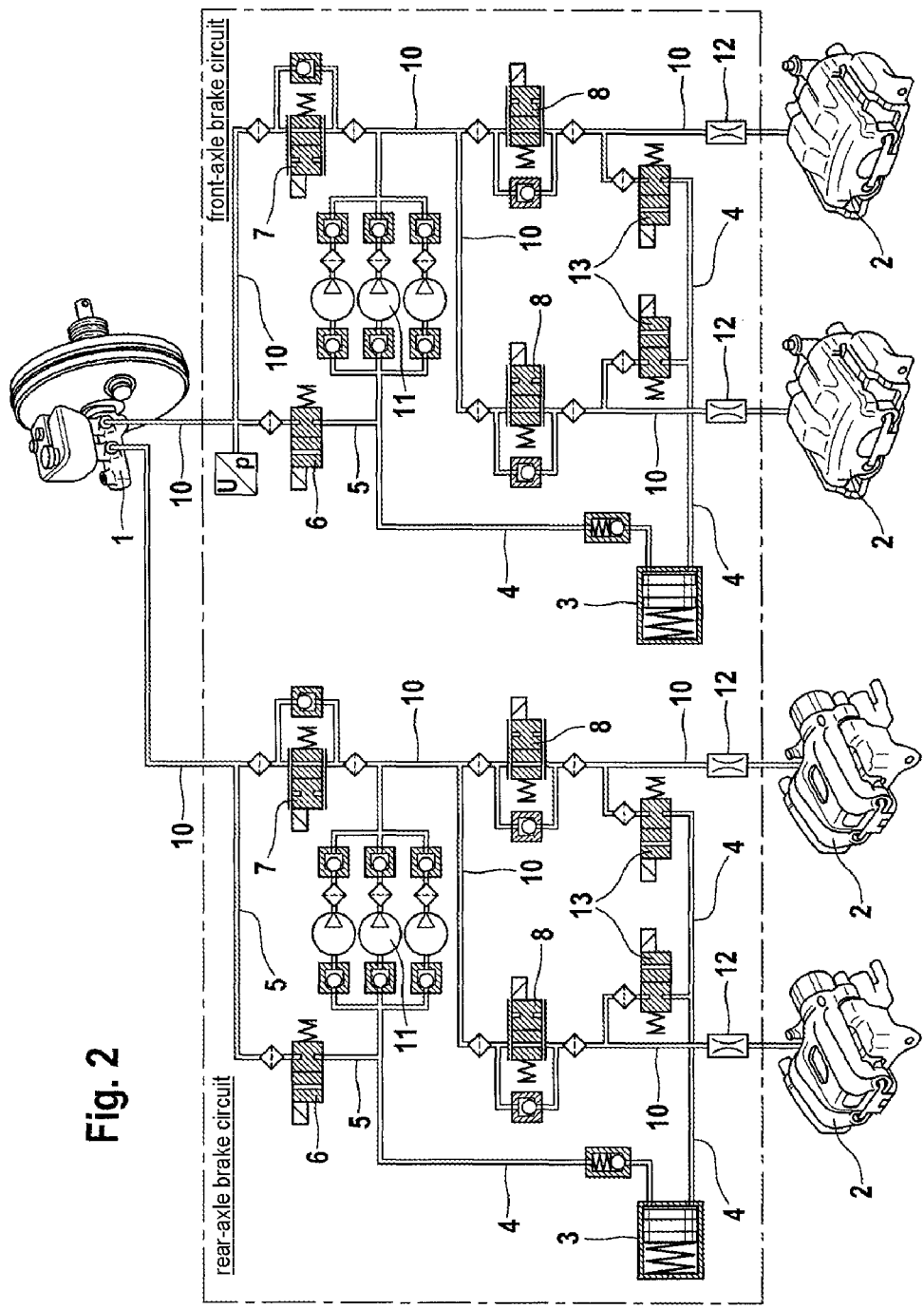

The invention envisages that when the master cylinder 1 is actuated by the driver, to achieve full utilization of the kinetic energy in an electric or hybrid vehicle, the pressure initiated by the master cylinder 1 can only be fed to the low-pressure accumulator 3, bypassing the wheel brake 2, and consequently not to the wheel brake(s) 2 normally used to brake the vehicle. This desire, or rather this need, not to decelerate the vehicle by means of the wheel brakes 2 exists when the vehicle brake system presented with the help of FIGS. 1 and 2 is used with its features essential to the invention with an electric or hybrid vehicle operating in a generator or regenerative braking mode. This is because the invention presented produces higher energy recovery in generator mode, since as a result of the wheel brakes 2 which are not acted on hydraulically according to the invention, greater kinetic energy for power generation is inevitably available to the electric motor in generator mode.

According to FIG. 1, in order to bypass the wheel brake 2, the master cylinder 1 actuated for anti-slip braking of the vehicle is therefore directly connected to the low-pressure accumulator 3 via the pump suction line 5 discharging into the return line 4, for which purpose the electromagnetic changeover valve 6 is open, while the isolation valve 7 and the pressure modulation valves 8, 13 on the inlet and outlet sides are closed. The volume of pressurizing medium forced into the low-pressure accumulator 3 during actuation of the master cylinder 1 is communicated to the driver in this case by an intrinsically familiar, desirable pedal feel, without the wheel brake(s) 2 actively assisting with the vehicle braking in generator mode.

However, irrespective of the nature of the brake pressure regulation for active vehicle braking by means of the wheel brakes 2, a directionally dependent break in the hydraulic connection between the master cylinder 1 and the low-pressure accumulator 3 is required, which is why a hydraulically actuatable changeover valve 9 is inserted in the return line 4, said valve being disposed between the outlet of the pump suction line 5 into the return line 4 and the low-pressure accumulator 3. The hydraulically actuatable changeover valve 9 is configured as a 2/2-way seat valve, which can be switched into the directionally dependent closed position for the purpose of active braking by a brake pressure initiated in the brake line 10, in which closed position the low-pressure accumulator 3 can only be flowed through in the direction of the pump 11. Consequently, a hydraulic shortcut to the low-pressure accumulator 3 via the electromagnetic changeover valve 6 is no longer possible, as soon as the hydraulic changeover valve 9 adopts its directionally dependent closed position.

The brake pressure increase takes place outside generator mode in a manner known per se for each wheel brake 2 via the open isolation valve 7 in each case (or possibly via the electromagnetically opened changeover valve 6 and the pump 11, when the isolation valve 7 is closed) in the direction of the pressure modulation valve 8 on the inlet side, so that the low-pressure accumulator 3 is only exposed to the pressure of the wheel brake(s) 2 after the pressure modulation valve 13 on the outlet side has been opened to reduce the brake pressure. The subsequent draining of the low-pressure accumulator 3 takes place unimpeded via the directionally dependent switch setting of the hydraulically actuated changeover valve 9 to the suction side of the pump 11 represented symbolically as a return valve.

Furthermore, unlike FIG. 1, FIG. 2 shows a particularly simple, alternative embodiment, according to which the actuated master cylinder 1 is initially hydraulically connected in a manner known per se via the isolation valve 7 inserted in the brake line 10 and also via the pressure modulation valve 8 on the inlet side in the direction of the wheel brakes 2, which are however provided with apertures 12 on the inlet side. As a result of the apertures 12, for the purpose of achieving the highest possible energy recovery with the electric vehicle in generator mode following the electromagnetic opening of the pressure modulation valves 13 on the outlet side, the brake pressure inevitably does not get into the wheel brakes 2 of each brake circuit but goes straight into the low-pressure accumulator 3, as the flow resistance generated by the apertures 12 is greater than a flow resistance caused in each brake circuit by the return line 4 and the pressure modulation valves 13 on the outlet side in the direction of the low-pressure accumulator 3.

Just as in FIG. 1, hydraulically activated vehicle braking by means of the wheel brakes 2 in the manner briefly described above is also possible in FIG. 2, as soon as the pressure modulation valves 13 on the outlet side adopt their closed position. So that the influence of the apertures 12 on the pressure increase and pressure reduction times in the wheel brakes 2 can be disregarded with active vehicle braking, the admission cross sections in the pressure modulation valves 8, 13 on the inlet and outlet sides are enlarged in relation to the apertures 12, so that the influence of the apertures is easily balanced.

While the above description constitutes the preferred embodiment of the present invention, it will be appreciated that the invention is susceptible to modification, variation, and change without departing from the proper scope and fair meaning of the accompanying claims.

The invention claimed is:

1. A hydraulic vehicle brake system comprising:
a brake line for conducting a hydraulic pressure medium, which connects a master cylinder attached to a non-pressurized storage vessel to a wheel brake,
a first pressure modulation valve on an inlet side of the wheel brake inserted in the brake line between the master cylinder and the wheel brake,
a second pressure modulation valve on an outlet side of the wheel brake inserted in a return line connecting the wheel brake to a low-pressure accumulator,
a pump disposed on the return line downstream of the low-pressure accumulator, the pump removing the hydraulic pressure medium from the low-pressure accumulator to regulate the brake pressure and conveying it via the first pressure modulation valve on the inlet side to the wheel brake and also via an isolation valve disposed in the brake line upstream of the first pressure modulation valve on the inlet side in the direction of the master cylinder,
a pump suction line discharging into a portion of the return line that extends between the pump and the low-pressure accumulator,
an electromagnetically opening changeover valve inserted in the pump suction line,
wherein when the master cylinder is actuated, the pressure provided by the master cylinder can be fed to the low-pressure accumulator, bypassing the wheel brake.

2. The hydraulic vehicle brake system as claimed in claim 1, wherein, to bypass the wheel brake, the master cylinder is directly connected to the low-pressure accumulator via the pump suction line discharging into the return line, for which purpose the electromagnetic changeover valve is open, and the isolation valve and the first pressure modulation valve on the inlet side are closed.

3. The hydraulic vehicle brake system as claimed in claim 1 wherein, for a directionally dependent break in the hydraulic connection between the master cylinder and the low-pressure accumulator, a hydraulically actuatable changeover valve is inserted in the return line, the hydraulically actuatable changeover valve being disposed between the discharge of the pump suction line into the return line and the low-pressure accumulator.

4. The hydraulic vehicle brake system as claimed in claim 3, wherein the hydraulically actuatable changeover valve is configured as a 2/2-way seat valve, which can be switched into the directionally dependent closed position by a brake pressure initiated in the brake line, in which closed position the hydraulic pressure medium in the low-pressure accumulator can only be flowed through in the direction of the pump.

5. The hydraulic vehicle brake system as claimed in claim 1, wherein, in order to bypass the wheel brake, the master cylinder is connected to the low-pressure accumulator via the isolation valve inserted in the brake line and also via the first pressure modulation valve on the inlet side, for which purpose the second pressure modulation valve on the outlet side inserted in the return line is opened electromagnetically and a flow resistance created by the return line and the second pressure modulation valve on the outlet side in the direction of the low-pressure accumulator is smaller than a flow resistance that can be generated by means of an aperture in the connection of the brake line to the wheel brake.

6. The hydraulic vehicle brake system as claimed in claim 1, wherein when the master cylinder is actuated, the pressure provided by the master cylinder can be fed to the low-pressure accumulator, bypassing the wheel brake and the first and second pressure modulation valves.

\* \* \* \* \*